United States Patent [19]

Price et al.

[11] 4,263,070
[45] Apr. 21, 1981

[54] THERMALLY STABLE GUN AND CASELESS CARTRIDGE PROPELLANTS

[75] Inventors: Raymond M. Price, Hollister; Russell Reed, Jr., Ridgecrest, both of Calif.

[73] Assignee: Thiokol Corporation, Newtown, Pa.

[21] Appl. No.: 449,195

[22] Filed: Mar. 5, 1974

Related U.S. Application Data

[63] Continuation-in-part of Ser. No. 329,258, Jan. 17, 1973, abandoned.

[51] Int. Cl.³ .............................................. C06B 45/10
[52] U.S. Cl. ............................ 149/19.4; 102/38 CC; 102/103; 149/92
[58] Field of Search .................... 149/19.4, 92; 102/38, 102/DIG. 1, 103

[56] References Cited

U.S. PATENT DOCUMENTS

| | | | |
|---|---|---|---|
| 3,529,042 | 9/1970 | Lippert | 149/19.4 |
| 3,725,154 | 4/1973 | McCulloch et al. | 149/92 X |
| 3,730,094 | 5/1973 | Quinlan | 102/DIG. 1 |
| 3,762,328 | 10/1973 | Rocha | 102/DIG. 1 |
| 3,834,957 | 9/1974 | McDevitt et al. | 149/19.4 |
| 3,847,081 | 11/1974 | Quinlan et al. | 102/DIG. 1 |

*Primary Examiner*—Edward A. Miller

[57] ABSTRACT

The water and oil resistance of caseless gun propellant compositions of the type which comprise cyclotetramethylenetetramine (HMX) as the high energy component and polyurethane as the binder are improved by preparing the binder by reaction of isocyanates with a hydroxyl-terminated block copolymer of ethylene oxide and propylene oxide or mixture of the block copolymer with other hydroxyl-terminated polyalkylene oxides. The block copolymer preferably contains from 40% to 60% by weight of ethylene oxide units and comprises at least 15% by weight of the binder.

6 Claims, No Drawings

THERMALLY STABLE GUN AND CASELESS CARTRIDGE PROPELLANTS

This application is a continuation-in-part of application Ser. No. 329,258 filed Jan. 17, 1973, and now abandoned.

This invention relates to extrudable, curable compositions adapted to be used in forming caseless gun propellant grains having ballistic properties at least comparable to those of conventional nitrocellulose-base gun propellants, such as the Improved Military Rifle smokeless powder, hereafter referred to as IMR, and having substantially improved thermal properties, as well as improved resistance to water and liquid hydrocarbons.

Rapid firing guns require gun propellants having high thermal stability, low flame temperatures, non-corrosive reaction products, low ash content and good resistance to gasoline, oil, and water. Lower propellant flame temperatures result in lower gun chamber and gun barrel temperatures, thus permitting the use of lighter metals such as aluminum and magnesium. The higher the thermal stability of the propellant, the less probability there is that self-firing of the round will occur. Less corrosive reaction products result in a longer barrel life of the gun.

Conventional smokeless propellants based on nitrocellulose, e.g., the IMR propellant referred to above, can be extruded into desired shapes to give a limited control of burning rate characteristics, but are subject to a number of disadvantages. The principal deficiency of these conventional propellants is their lack of thermal stability. Autocatalytic decomposition of the propellants occur at a relatively low temperature and thus premature ignition in a hot gun chamber can be avoided only by encasing the propellant grains or pellets in a metal case. Also such conventional propellants lack the necessary mechanical strength and resistance to water, gasoline and oil for use as a caseless cartridge.

Different approaches have been used in the prior art in an effort to overcome these drawbacks, ranging from redesigns of the cartridge to the addition of flame suppressants and corrosion protectors as described in U.S. Pat. Nos. 3,658,008; 3,626,851; 3,616,759; 3,598,052; 3,557,700; 3,563,177; and 3,463,086, but none of these approaches has satisfactorily solved the problem. Other patents that disclose gun propellants include U.S. Pat. Nos. 2,995,430; 3,116,190; 3,392,669; 3,209,609; 3,676,233; 3,386,868; and 3,673,286, but these patents fail to disclose compositions similar to those of the present invention. Also the rocket propellant art as exemplified by U.S. Pat. Nos. 3,026,672; 3,666,576; 3,629,020; 3,000,718; 3,068,129; 3,532,566; 3,532,567; and 3,625,782 fails to teach a solution of these problems.

In parent application Serial No. 329,258, of which the present application is a continuation-in-part, it is disclosed that gun propellant compositions capable of being formed into caseless cartridges having substantially improved thermal stability, relatively low flame temperature, good mechanical properties and oil and water resistance, and controllable burning characteristics can be achieved by using a high energy component which is cyclotetramethylenetetranitramine (HMX) in combination with certain polymeric binders having a molar ratio of oxygen to carbon within the range 0.31:1.0 to 1.0:1.0. The disclosed polymeric binders include polymers of formaldehyde, certain acrylates and methacrylates, and alkylene oxide polymers, as well as polyurethanes having a polyether backbone. It is further disclosed that by using as a binder a polyurethane which is a cross-linked reaction product of a multifunctional isocyanate and hydroxyl-terminated polyethers including a substantial amount, i.e., at least 15% by weight of the binder, of a hydroxyl-terminated block copolymer of ethylene oxide and propylene oxide, the cured product exhibits exceptionally good resistance to oil and water. The present application is particularly directed to such highly water- and oil-resistant compositions, which share the improved thermal properties, low flame temperature and controllable burning rates of the other compositions disclosed in the patent application.

In general the present compositions are made by preparing an intimate mixture of a major amount of HMX having an average particle size of 1 to 60 microns, a minor amount of binder ingredients comprising principally a hydroxyl-terminated block copolymer of ethylene oxide and propylene oxide, or a mixture of such a block copolymer with one or more hydroxyl-terminated polyalkylene oxides, e.g., polyethylene oxide or polypropylene oxide, a small amount of a cross-linking agent which may be a polyol or polyisocyanate having a functionality greater than two and a quantity of diisocyanate, which together with the polyfunctional isocyanate, if used, is somewhat greater than that required to react with the terminal hydroxyl groups of the polyalkylene oxides and the hydroxyl groups of the polyol, if used. Desirably a small amount of a conventional catalyst of the type known to be useful in the preparation of polyurethanes is included.

The mixture preferably contains on a weight basis, from 65% to 90% of HMX, from 5% to 20% of the hydroxyl-terminated polyalkylene oxides, from 0.5% to 5% of a triol cross-linking agent and from 1 to 15% of a diisocyanate. The mixture as thus formulated is readily moldable by extrusion or pressing to form pellets or grains of the desired physical configuration and is thereafter cured at an elevated temperature.

In accordance with a preferred embodiment of the present process the binder components are first mixed and the HMX thereafter blended therein. Any suitable mixer such as e.g., a vertical Baker Perkins mixer is used. As disclosed in parent application Ser. No. 329,258, a propellant having an exceptionally low burning rate exponent can be achieved by reducing the average particle size of the HMX to about 1 to 5 microns. Such reduction in particle size of the high energy component can be achieved by passing the mixture through a fluid energy mill. After mixing and extrusion or pressing, the pellets or grains are cured by heating at an elevated temperature. Typically moderately hard cures are obtained after 18 hours at 77° C. and final cures after an additional 72 to 75 hours at 100° C.

The ethylene oxide/propylene oxide copolymer used preferably has a molecular weight of about 1000 to 4000 and contains from 40% to 60% by weight of ethylene oxide units. The cross-linking agent may be a polyol such as trimethylol propane, trimethylol ethane, glycerol, sorbitol, pentaerythritol or hexane triol. Trimethylol propane is preferred.

In general any of the organic diisocyanates known to be useful in the preparation of polyurethanes may be used. The nature of the organic radical which carries the isocyanate groups is not critical so long as it is compatible with the other ingredients employed and may be, for example, aliphatic, alicyclic, aryl or heterocyclic. The preferred isocyanates are methyl 2,6-diisocyanatocaproate (lysine diisocyanate) and tolylene diiscyanate.

The catalysts employed are preferably known acid catalysts chosen to decrease the curing temperature, time or both. Suitable catalysts are ferric acetylacetonate and titanyl acetylacetonate ($TiO(AA)_2$). Other metal acetoacetonates and other acid catalysts can be used, depending upon the required curing temperature and time.

As indicated above, the present compositions having a block copolymer of ethylene and propylene oxides incorporated in the binder thereof exhibit superior oil and water resistance.

It has been found that the oil resistance of the present compositions is greater than that of similar cured compositions containing only polypropylene oxide and the water resistance is greater than that of similar compositions containing only polyethylene oxide. Physical mixtures of polypropylene oxide and polyethylene oxide are not compatible in that separation occurs but it has been found that if the hydroxyl-terminated block copolymer is present, a certain amount of hydroxyl-terminated polyethylene oxide and/or polypropylene oxide can be incorporated in the reaction mixture and a compatible, tough, gasoline and water resistant composition can still be achieved.

In order to point out more fully the nature of the present invention, a number of examples are given below of illustrative formulations and their properties. In these formulations various commercially available ingredients are referred to by their trade designations or abbreviations and may be further defined as follows:

| | |
|---|---|
| LDIM | Lysine diisocyanate (methyl 2,6-di-isocyanatocaproate |
| Pluronic L-64 | A hydroxyl-terminated block copolymer of ethylene and propylene oxides having an average molecular weight of 2900 and and ethylene oxide/propylene oxide weight ratio of 60:40. |
| Pluronic L-44 | A similar block copolymer having an average molecular weight of 2000 and an ethylene oxide/propylene oxide weight ratio of 40:60. |
| Pluronic L-35 | A similar block copolymer having an average molecular weight of 1900 and a weight ratio of ethylene oxide to propylene oxide of 50:50. |
| PPG-1025 | A hydroxyl-terminated polypropylene oxide with an average molecular weight of 1025. |
| Carbowax C-600 | A hydroxyl-terminated polyethylene oxide with an average molecular weight of 600. |
| TMP | Trimethylol propane. |

The components and ingredients of seven formulations of moldable curable propellant compositions, prepared in accordance with the method described above, are given in Table I below. In the illustrative formulations all amounts are given in parts by weight unless otherwise indicated. Also data concerning the water resistance values of several of the formulations are given in Table I. These data were obtained by immersing the cured formulation in water for 24 hours, then removing and air drying it. In the Table the percent water retention after drying of the indicated number of hours is given.

TABLE I

| Formulation No. | 1 | 2 | 3 | 4 | 5 | 6 | 7 |
|---|---|---|---|---|---|---|---|
| Equivalent Weight Proportions of NCO/Diol/Triol Composition, Parts by Weight | 132/40/60 | 122/22/78 | 110/25/75 | 110/20/80 | 110/25/75 | 110/15/85 | 110/35/65 |
| LDIM (Lysine diioscyanate methyl ester) | 3.36 | 49.8 | 7.52 | 6.45 | 7.52 | 9.81 | 9.19 |
| Pluronic L-35 | — | — | 15.32 | — | 15.32 | 11.99 | 4.63 |
| Pluronic L-44 | — | — | — | 16.58 | — | — | — |
| Pluronic L-64 | 21.00 | 18.69 | — | — | — | — | — |
| C-600 | — | — | — | — | — | — | 4.32 |
| PPG-1025 | — | — | — | — | — | — | 4.60 |
| TMP | 0.64 | 1.33 | 2.16 | 1.97 | 2.16 | 3.26 | 2.26 |
| $TiO(AA)_2$ | 0.05 | 0.05 | 0.05 | 0.05 | 0.05 | 0.10 | — |
| HMX (1.6 micron diameter) | — | — | — | — | 75.00 | 75.00 | — |
| HMX (2.0 micron diameter) | — | — | 75.00 | 75.00 | — | — | — |
| HMX (2.2 micron diameter) | 75.00 | 52.27 | — | — | — | — | — |
| HMX (6.0 micron diameter) | — | 22.73 | — | — | — | — | — |
| Water Retention (%) | | | | | | | |
| Air dried | | | | | | | |
| 1 hour | | | 4.16 | 3.49 | | | 2.26 |
| 4 hours | 8.41 | 5.41 | 2.85 | 2.45 | | | 1.60 |
| 24 hours | 3.55 | 2.05 | 1.58 | 1.32 | | | 0.84 |
| 108 hours | 1.17 | 0.39 | 0.43 | 0.34 | | | 0.32 |

The formulations of Table I differed somewhat is viscosity but all had a consistency similar to that of bread dough. They could be easily extruded through an orifice of 0.15 inches diameter at moderate pressure. The formulations were extruded to form pellets which cured to moderate hardness after 18 hours at 77° C. and cured to a final or finish cure after an additional 72 to 75 hours at 100° C. The cured pellets had an ASTM Shore A hardness value varying from 91 to 96. Their scratch resistance was qualitatively determined by scratching the materials with a scribe and all the formulations had good to outstanding scratch resistance qualities.

In addition to formulations 1 to 4 and 7 of Table I, other similar formulations were tested for water resistance. Also similar tests were performed by immersing cured samples in gasoline for 24 hours and measuring the retained gasoline after air drying. In general, the cured samples retained only 0.9% to 3% of the water absorbed, and only 0.5 to 1% of the gasoline absorbed. Thus they had an exceptional resistance to gasoline and water as compared to conventional smokeless powder propellants such as IMR smokeless powder.

As pointed out above, the present compositions not only exhibit improved resistance to water and hydrocarbons, but also, like the other compositions of parent application Serial No. 329,958, have good mechanical properties and thermal and ballistic properties superior to those of the IMR smokeless powder.

The mechanical properties of the formulations of Table I, after curing, are illustrated by the results obtained with formulations 5, 6 and 7 as set forth in the following Table:

TABLE II

| Formulation No. | 5 | 6 | 7 |
|---|---|---|---|
| Modulus E, p.s.i. | 12,071 | 15,770 | 13,000 |
| Maximum stress, $\sigma_m$ p.s.i. | 947 | 1,122 | 1,060 |
| Strain $\left(\frac{t}{m}\right)$ + in./in. | 0.08 | 0.06 | 0.06 |
| Strain $\left(\frac{r}{m}\right)$ + in./in. | 0.09 | 0.06 | 0.08 |

These values show the high mechanical stability of the present compositions for use in guns, thus avoiding binding or distortion in the gun chamber.

The superior thermal properties of the cured formulations of Table I as compared with those of a conventional propellant are illustrated by the date of Table III. The autoignition tests were performed according to ASTM Method D286 and the differential thermal analysis (DTA) tests were made according to ASTM Method E-14. The latter test shows the decomposition point for flame ignition as a function of temperature.

TABLE III

| Formulation No. | 3 | 4 | 6 | IMR Powder |
|---|---|---|---|---|
| Auto-ignition at 550° F. (sec.) | 18.5 | 23.0 | 31.0 | 2.6 |
| Auto-ignition at 450° F. (sec.) | | | 600 | 7.2 |
| DTA (9° F.)/sec.) °F. | 480 | 480 | 480 | 370 |
| Explosion Temp., 5 sec. (°F.) | | | 664 | 469 |

The foregoing data illustrate the superior thermal properties of the present compositions as compared with IMR smokeless powder. In the case of the present compositions the products of the auto-ignition tests were smoke, whereas the IMR powder flamed upon ignition.

The ballistic properties of the present compositions are illustrated by the comparative data of Table IV:

TABLE IV

| Formulation No. | 6 | IMR smokeless powder |
|---|---|---|
| Theoretical Mass Impetus ft. lb./lb. | 340,000 | 340,000 |
| Measured Mass Impetus ft. lb./lb. | 278,000 | 279,000 |
| Isochoric Flame Temp., °K. | 2375 | 2900–3000 |
| Burning Rate (10,000 p.s.i.) | 1.1 | 3.7 |
| Pressure exponent n | 0.91 | 0.75 |

It should be noted that the flame temperature for composition 6 was significantly lower than that for the IMR powder.

As indicated above, the burning rate and pressure exponent properties of the present compositions can be changed by varying the HMX particle size as shown in Table V. In obtaining the data of Table V, formulation No. 6 of Table I was used.

TABLE V

| Average HMX Particle Diameter, Microns | Burning rate, 10,000 psi | in./sec. 25,000 psi | Pressure Exponent, n |
|---|---|---|---|
| 2 | 1.05 | 2.40 | 0.91 |
| 70% 6 micron and 30% 2 micron | 1.10 | 2.85 | 1.06 |
| 60 | 6.50 | 35.00 | 1.81 |

The foregoing data indicate that the thermal stability and ignition resistance of the present propellants are better than those of IMR smokeless powder. Also the explosion temperature, taken as that temperature which causes ignition of the propellant when maintained for 5 seconds at the explosion temperature was 664° F. for the propellant formulation No. 6 and 469° F. for the IMR powder. Formulation No. 6 burns at a rate of 8 inches per minute to a depth of 0.12 inches in a trough burning rate test, whereas the IMR powder has a 32-inch per minute burning rate with complete burning of the powder.

While the desirable properties of the present compositions as described above make then especially suitable for use in making caseless cartridges, it will be recognized by those skilled in the art that because of these desirable properties the compositions can also be used with advantage in making the usual extruded gun propellants. The adjustment of the burning rate and pressure exponent by varying the HMX particle size provides a means of adjusting ballistic performance superior to the conventional means of adjusting ballistic performance, namely, varying the ratio of surface area to propellant weight by changes in grain shape and the use of single or multiple perforations.

It is, of course, to be understood that the foregoing formulations are intended to be illustrative only and that numerous changes can be made in the ingredients and proportions thereof without departing from the scope of the invention as defined in the appended claims.

I claim:

1. An extrudable, curable composition suitable for use in making a caseless gun propellant grain and having improved water and oil resistance, said composition consisting essentially of an intimate mixture of 65 to 90% by weight of finely divided HMX, 5 to 20% by weight of a block copolymer of ethylene oxide and propylene oxide containing 40% to 60% by weight of ethylene oxide units and having a molecular weight of 1000 to 4000, 0.5 to 5% by weight of a triol cross-linking agent and 1 to 15% by weight of a multi-functional isocyanate.

2. The composition of claim 1 wherein the triol cross-linking agent is trimethylol propane.

3. The composition of claim 1 wherein the multi-functional isocyanate is lysine diisocyanate methyl ester.

4. The composition of claim 1 wherein the multi-functional isocyanate is tolylene diisocyanate.

5. The composition of claim 1 wherein the average particle diameter of the HMX is from 1 to 5 microns.

6. Gun propellant grains formed from the extruded and cured composition of claim 1.

* * * * *